United States Patent

[11] 3,630,674

| [72] | Inventor | James G. Davidson, Jr. |
| --- | --- | --- |
| | | Whitehall, Mich. |
| [21] | Appl. No. | 833,145 |
| [22] | Filed | June 13, 1969 |
| [45] | Patented | Dec. 28, 1971 |
| [73] | Assignee | Hooker Chemical Corporation |
| | | Niagara Falls, N.Y. |

[54] BLEACHING OF ALKALI METAL HYDROXIDE SOLUTIONS
7 Claims, No Drawings

[52] U.S. Cl............................................................ 23/184,
204/98
[51] Int. Cl............................................................ C01d 1/06,
C01d 1/00
[50] Field of Search............................................. 204/98;
23/184

[56] References Cited
UNITED STATES PATENTS
2,366,546  1/1945  Nichols ........................ 23/184

OTHER REFERENCES
Geral, Roquero and Pomata Ciencia (Mexican) 1,21–2 (1940)

*Primary Examiner*—Winston A. Douglas
*Assistant Examiner*—H. A. Feeley
*Attorneys*—Peter F. Casella, Donald C. Studley, Richard P. Mueller and James F. Mudd ABSTRACT: Consistent color removal from aqueous alkali metal hydroxide solutions is obtained by prebleaching such solutions with a chlorine bleaching agent, and then afterbleaching the product with hydrogen peroxide.

BLEACHING OF ALKALI METAL HYDROXIDE SOLUTIONS

This invention relates to the improvement of color quality and clarity of aqueous alkali metal hydroxide solutions. In particular, the invention relates to a method for improving the color quality and clarity of alkali metal hydroxide solutions produced in diaphragm-type chlor-alkali electrolytic cells which comprises bleaching such hydroxide solutions by the sequential addition of a chlorine bleach and hydrogen peroxide to these solutions.

Aqueous alkali metal hydroxide solutions derived from diaphragm-type chlor-alkali cells have a characteristic color content which renders them commercially undesirable. Although the color may be relatively faint in the dilute effluent as it issues from the cell, the color, which can vary in hue from blue to pink, becomes more pronounced as the alkali metal hydroxide solution is concentrated. The 50 or 70 percent alkali metal hydroxide solutions commonly desired for commercial purposes typically have an objectionably intense coloring. Color may also develop in relatively clear alkali metal hydroxide solutions upon standing, for example during the course of conventional sedimentation procedures, whether or not the concentration of the alkali metal hydroxide solution is being increased. The phenomenon has frequently been attributed to the action of actinic light on the solution as well as to being a derivative from the graphite anodes utilized in diaphragm-type chlor-alkali cells. Regardless of its origin, however, it has been the source of concern to manufacturers of commercial alkali metal hydroxide solutions.

The processes presently employed to eliminate the color content of such alkali metal hydroxide solutions typically utilize bleaching procedures, generally admixing an oxidizing agent such as sodium hypochlorite with the concentrated hydroxide solution. Although a substantial amount of the color present in the hydroxide solution may be eliminated by this method, depending on the hydroxide solution and the bleaching conditions, the results are unpredictable, and colorless solutions are not consistently obtained. Owing to the indeterminate nature of the causes of the development of color in alkali metal hydroxide solutions derived from chlor-alkali cells, the amount of chlorine bleach necessary to eliminate the color in these solutions cannot be precisely determined prior to initiation of bleaching procedures. If insufficient amounts of chlorine bleach are admixed with the hydroxide solution, the material will be underbleached, and a slight original color will persist in the resulting solution. If an excess of chlorine bleach is employed, the solution will turn a light yellow to bright red color, depending on the degree of overbleaching. Even if the correct amount of bleach has been employed by chance, and a colorless solution is initially obtained, this solution will develop color on standing, typically assuming a light green or blue cast. Such hydroxide solutions are not competitive in clarity and color content with alkali metal hydroxide solutions produced, for example, from mercury cells, and it has therefore long been an object for manufacturers of alkali metal hydroxide from diaphragm-type chlor-alkali electrolytic cells to eliminate this problem. Although it has been proposed to use bleaches other than chlorine bleaches in an effort to obtain colorless alkali metal hydroxide solutions from these chlor-alkali cells, such bleaches, for example hydrogen peroxide, have proved formidably expensive, and cannot be used in commercial processes economically.

It has now been found that consistent color removal from alkali metal hydroxide solutions and improved clarification of these solutions can be effected in an economical fashion by a process comprising prebleaching a colored alkali metal hydroxide solution with a chlorine bleaching agent and subsequently after-bleaching the hydroxide-bleach solution with relatively small amounts of hydrogen peroxide. This procedure will dispel any color present in the solution, or, in the event that there is no color present in the prebleached solution, will prevent subsequent development of color in the solution. Alkali metal hydroxide solutions treated according to this method have exceptional clarity, are color free, and are color stable.

The process has particular application to alkali metal hydroxide solutions produced in diaphragm-type chlor-alkali electrolytic cells, since such solutions characteristically have an objectionable color content which is intensified during preparation for commercial use. Further, the long storage periods frequently involved for such preparations will generally result in the development of color in the hydroxide solutions, even if an initially color-free solution is obtained by conventional bleaching procedures. The process of this invention provides a method of maintaining alkali metal hydroxide solutions in a clear, color-free state over long periods of time, thus increasing their commercial desirability.

When treating an alkali metal hydroxide solution according to the process of this invention, the hydroxide solution is first prebleached with a conventional chlorine bleaching agent. The resulting solution is aged until completely reacted, and then afterbleached with relatively small amounts of hydrogen peroxide. The thus bleached solution is again permitted to age until a clear, colorless solution is obtained. Broadly, the chlorine bleaching material is preferably added to the alkali metal hydroxide solution in amounts sufficient to provide a product which is neither markedly overbleached nor underbleached, and the product is then aged until the materials have been completely reacted. Hydrogen peroxide is then reacted with the hydroxide-chlorine bleach solution in amounts sufficient to dispel any color present and maintain the solution in a color-free state upon standing. Relatively minor amounts of hydrogen peroxide are generally required to obtain a color-free, color-stable solution; however, if the hydroxide solution has been excessively over- or under-bleached with the chlorine bleach material, increased amounts of hydrogen peroxide will be necessary to dispel the more intense color present. Although the color-free, color-stable hydroxide solutions of the process can be obtained by the use of such increased amounts of hydrogen peroxide when the prebleaching step has resulted in excessively over- or under-bleached hydroxide solutions, if large enough quantities of hydrogen peroxide are required to effect color removal in the hydroxide-chlorine bleach solution, the process will be prohibitively expensive for commercial use.

Following reaction of the hydrogen peroxide with the chlorine bleach-hydroxide solution, the reaction mixture is aged for sufficient time to permit the salt dropout which may occur on addition of the hydrogen peroxide to the prebleached hydroxide solution to go into solution, or until the solution is colorless. The thus bleached solution can then be stored for an indefinite period of time as a clear, colorless solution, comparable in clarity and color content to alkali metal hydroxide solutions obtained from, for example, mercury cells.

The chlorine bleaching agent employable in the process of this invention may be any conventional bleaching solution containing available chlorine or, alternatively, chlorine gas. When a bleaching solution is used, a sodium hypochlorite bleach solution is preferred, since the addition of hydrogen peroxide will decompose any excess hypochlorite, leaving the finished solution free of undesirable salts. Although, for example, sodium chlorite and sodium chlorate solutions are effective bleaching agents, hydrogen peroxide may not effectively prevent the presence of chlorate and chlorite salts in the finished hydroxide solution, and if it is desired that the finished product be chlorate and chlorite free, the use of these bleaching agents is not preferred. When chlorine gas is employed, conventional procedures for bleaching alkali metal hydroxide solutions with this material are followed, for example, the chlorine may be injected into the hydroxide solution from a cylinder.

The use of hydrogen peroxide in the afterbleaching step of the process is preferred. Although other peroxides, for example, sodium peroxide, are effective bleaching agents for use in this step of the process, contaminants in the prebleached hydroxide solution, particularly prevalent in hydroxide solutions produced in diaphragm-type chlor-alkali electrolytic cells, may react with such other peroxides. These side reactions are generally undesirable, and in some cases dangerous, and the use of such peroxides is not usually appropriate for these reasons. In some cases, however, for example, when the prebleached hydroxide solution is free of reactive contaminants, sodium peroxide, potassium peroxide, or other comparable peroxides may be suitably substituted.

The proportion of bleach added to the alkali metal hydroxide solution in each bleaching step of the process of this invention will vary according to the composition and concentration of the alkali metal hydroxide solution, the strength of the bleaching additive, and in the case of the hydrogen peroxide, the effective amount of chlorine bleaching agent added in the previous bleaching step. For a 50 percent alkali metal hydroxide solution of average color content, for example, chlorine bleach solution, typically sodium hypochlorite, containing from about 75 to about 130 grams of available chlorine per liter is added in amounts from about 0.05 percent to about 0.25 percent by volume of the hydroxide solution. In general, the use of larger or smaller effective amounts of the chlorine bleach solution with such hydroxide solutions will result in excessively over- or under-bleached material, which is to be avoided. The chlorine bleach preferably contains from about 100 to about 115 grams of available chlorine per liter to avoid corrosion problems at the higher chlorine concentrations and excessive volume of bleach additive at the lower chlorine concentrations. When chlorine bleach is added as a solution containing the preferred available chlorine content, satisfactory results are obtained with most 50 percent alkali metal hydroxide solutions if from about 0.13 to about 0.20 volume percent of chlorine bleach solution is added to the hydroxide solution. When chlorine gas is employed as the chlorine bleaching material, a suitably bleached 50 percent alkali metal hydroxide solution is obtained in most instances if from about 0.01 percent to about 0.05 percent of chlorine gas by weight of hydroxide solution is reacted with the hydroxide solution.

The hydrogen peroxide or other selected peroxide may be added in any convenient form to the prebleached hydroxide solution. Desirably, it is added as a solution containing from about 5.5 percent to about 10 percent $H_2O_2$ by volume and preferably from about 6 to about 8 volume percent. Hydrogen peroxide solution is added in amounts ranging from about 0.01 to about 0.001 percent by volume of the alkali metal hydroxide-chlorine bleach solution. Although greater effective amounts of peroxide can be added, the benefits obtained by the addition of amounts in excess of those described will generally be negligible in the case of an average 50 percent alkali metal hydroxide solution when such solution has been adequately prebleached. Of course, in the case of both chlorine bleach solution and the peroxide solution, the strength of the solutions can be varied beyond those ranges given when the amount of such solution is accordingly adjusted to give effective amounts of additive falling within the described range, and vice versa.

Any convenient means of combining the bleaching agents and the alkali metal hydroxide solution may be utilized, preferably, the reactants are thoroughly mixed after each addition to ensure complete reaction of the bleaching agents with the hydroxide solution.

After the addition of each bleaching agent, an aging period should be provided during which time the solution is allowed to stand quiescent. Following addition of the chlorine bleach material in the prebleaching step, the reaction mixture is permitted to age until complete reaction is achieved, or until no further color change in the solution is observed. The time period required to effect this may vary considerably, depending on the composition of the alkali metal hydroxide solution, the amount of chlorine bleaching material employed, and the reaction conditions generally. Following addition of the hydrogen peroxide in the afterbleaching step, another aging period is provided to permit complete reaction of the mixture. Again, this period may vary according to the reaction conditions employed, including the composition of the reactants; however, at least sufficient time to achieve a desirable color content in the product should be allocated. In some instances, considerations other than color content may determine the extent of effective aging periods; for example, when hypochlorite is used as the chlorine bleaching agent, salt dropout will occur upon addition of the hydrogen peroxide to the alkali metal hydroxide-chlorine bleach solution in the afterbleaching step. Adequate time should then be allowed during the aging period following afterbleaching to permit the precipitate to dissolve into the solution, if a clear solution is desired. Typically, the aging times after the chlorine bleach and peroxide bleach additions are from about 2 to about 7 hours, although both longer and shorter aging times may be used in some instances. Generally, extensive aging times may not be commercially feasible although they are not detrimental to the process.

In a preferred commercial embodiment of the process, one full batch of sodium hypochlorite bleach of about 70 to about 75 gallons containing about 100 to about 115 grams per liter of available chlorine is added to about 40,000 to about 45,000 gallons of 50 percent sodium hydroxide solution produced in a diaphragm-type chlor-alkali electrolytic cell. The reaction mixture is agitated, and then permitted to age until reaction is completed, whereupon the solution is filtered according to conventional filtering processes. From about 6 to about 8 percent hydrogen peroxide solution is then added to the filtered hydroxide-chlorine bleach solution at a rate of about one-fourth to about one-half gallon of peroxide to about 12,000 gallons of filtered hydroxide. The mixture is again permitted to age until the salt dropout is dissolved, and the solution is clarified and color free. The solution will then remain color free even after long storage periods.

The following examples provide detailed illustration of the process of the invention.

EXAMPLE 1

To an aging tank having a capacity of 45,000 gallons was added a 50 percent sodium hydroxide solution until the tank was about two-thirds full. To this was added one batch (70 gallons) of NaOCl bleach solution containing 102.8 grams per liter of available chlorine. Circulation of the solution was started, and sodium hydroxide solution addition continued until the tank was filled. The chlorine bleach-hydroxide solution was then permitted to age for 5 hours and then the solution was filtered through precoated Vallez filters. During filtration, 7 percent by volume $H_2O_2$ solution was added to the clear liquor filtrate at a controlled rate of ¼-gallon $H_2O_2$ solution per 12,000 gallons of filtered hydroxide-chlorine bleach solution. This finished solution was then pumped to storage tanks, where it was aged for 5 days. Both clarity and color quality of the finished hydroxide solution was found to be excellent after aging.

EXAMPLE 2

The procedure of example 1 is followed, with the exception that instead of the hypochlorite bleach solution, 120 pounds of chlorine gas is gradually introduced from a cylinder into the aging tank as it is being filled with the hydroxide solution. After aging, the finished hydroxide is found to have excellent color quality and clarity.

Although the present invention has been described in terms of certain embodiments or examples, it is not intended that this invention be limited by these embodiments or examples except as indicated by the following claims.

What is claimed is:

1. A process for removing color from aqueous alkali metal hydroxide solutions, said solutions containing at least 50 percent alkali metal hydroxide, produced in diaphragm-type chlor-alkali electrolytic cells, which comprises:

a. prebleaching said aqueous alkali metal hydroxide solution with a chlorine bleaching agent in an amount sufficient to substantially remove the color from the aqueous alkali metal hydroxide solution;
b. aging the prebleached solution for a period of time to effect substantially complete reaction;
c. afterbleaching the aged solution with hydrogen peroxide in an amount sufficient to dispel any color and to maintain the solution in a color-free state upon standing; and
d. aging the afterbleached solution for a period of time sufficient to provide a colorless solution.

2. The process of claim 1, wherein the alkali metal hydroxide solution is a 50 percent sodium hydroxide solution.

3. The process of claim 1, wherein the chlorine bleaching agent is a chlorine bleach solution containing from about 75 to about 130 grams of available chlorine per liter.

4. The process of claim 1, wherein the chlorine bleaching agent comprises chlorine gas.

5. The process of claim 1, wherein the hydrogen peroxide is added as a solution containing from about 5.5 to about 10 percent by volume of hydrogen peroxide.

6. The process of claim 2, wherein the hydrogen peroxide is added as a solution containing from about 5.5 to about 10 percent by volume by hydrogen peroxide in amounts of from about 0.001 to about 0.01 percent by volume of the prebleached solution.

7. The process of claim 2, wherein the chlorine bleaching agent is a sodium hypochlorite solution containing from about 75 to about 130 grams of available chlorine per liter which is added to the hydroxide solution in amounts of from about 0.13 to about 0.20 volume percent of the hydroxide solution.

* * * * *